June 7, 1932.  J. LEDWINKA  1,861,967
REAR QUARTER WINDOW CONSTRUCTION FOR VEHICLE BODIES
Filed Dec. 21, 1927
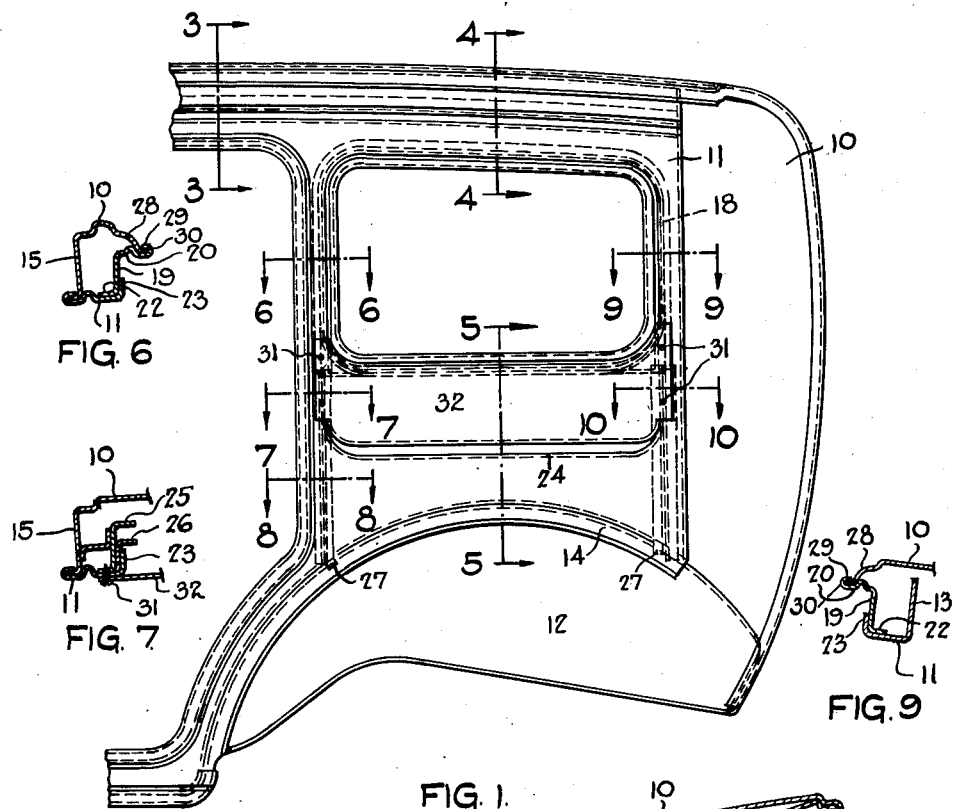
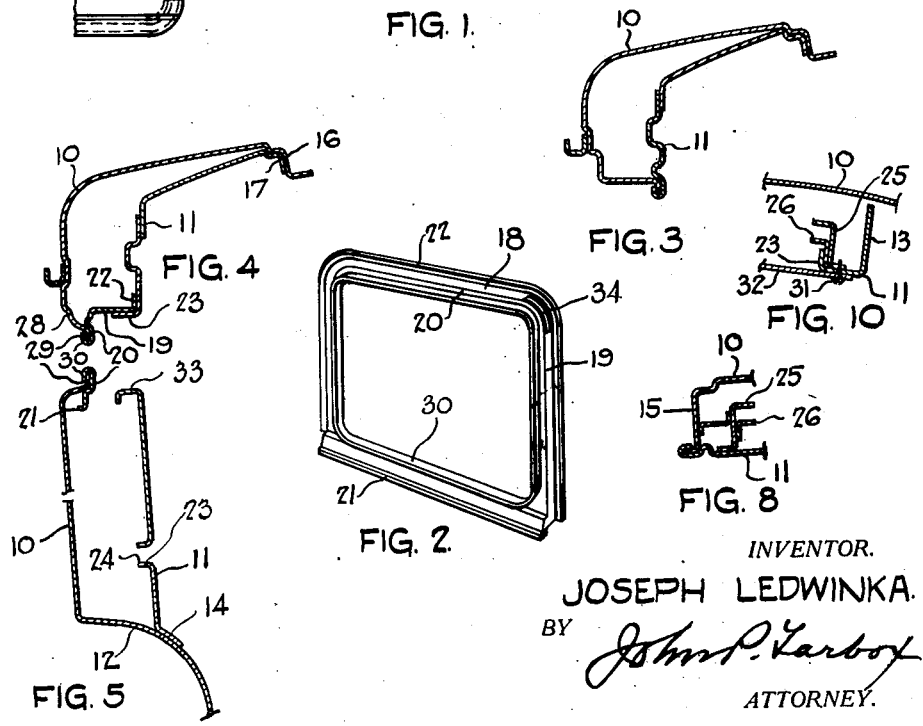
INVENTOR.
JOSEPH LEDWINKA.
BY
ATTORNEY.

Patented June 7, 1932

1,861,967

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

REAR QUARTER WINDOW CONSTRUCTION FOR VEHICLE BODIES

Application filed December 21, 1927. Serial No. 241,693.

My invention relates to vehicle bodies and more particularly to the rear quarter window construction of such bodies.

It is an object of my invention to simplify and strengthen the rear quarter window construction of vehicle bodies, particularly in bodies in which the side walls are formed of large sheet metal stampings extending entirely around the rear quarter window opening, and to make provision for the use of a sliding window in bodies of this class without detracting from the strength and rigidity of the body wall in this region.

I attain this object in part by making the window frame which serves also as a part of the glass run for the sliding window, as a single unitary stamping extending entirely around the window opening, and by suitably joining this frame to the outer and inner panel stampings, through a large portion of the perimetral extent of said frame.

Other and further objects and advantages of my new improved construction will become apparent as the description proceeds.

In the accompanying drawing, I have illustrated a preferred form of my invention.

In this drawing,

Fig. 1 is an inside elevation of a portion of the side wall of a body to which my invention is applied.

Fig. 2 is a perspective view, as seen from its outer side, of the unitary one-piece stamping surrounding the window opening and forming portions of the window glass run, Figs. 3 to 10, inclusive, are detail sectional views taken respectively, on the correspondingly numbered section lines of Fig. 1.

In the body to which my invention is shown applied, which is of the sedan type, the side wall is built up of unitary inner and outer panels 10 and 11 of sheet metal, the outer unitary panel 10 extending from the front post to and around the rear quarter and from the bottom of the body to the top and around the roof quarter at the top to form a portion of the roof. In rear of the rear door opening the usual wheel housing 12 is formed in the outer panel.

The inner panel 11 is substantially coextensive with the outer panel, except that it terminates a short distance rearwardly of the rear quarter window, where it is provided with an outwardly extending stiffening flange 13, and at the wheel housing, it is flanged as at 14 and secured to the crown of the wheel housing 12 in spaced relation to the main body of the outer panel. Thus a well is formed between the inner and outer panels above the wheel housing, to receive the rear quarter window when it is lowered.

In the margins of the door openings the inner and outer panels are secured together by crimping one over the other as shown in Figs. 6, 7 and 8, the outer paneling being formed with a transversely extending flange 15 at the door opening which forms the jamb face of the door, as heretofore proposed. At the top the outer and inner panels are flanged at 16 and 17 and secured together through the flanges as by spot welding. The construction so far described is substantially as heretofore proposed. Heretofore, however, the joinder of the outer and inner panels at the rear quarter window was substantially the same as the joinder at the doors, namely, by transversely flanging the outer panel and joining the inner panel thereto around the window opening by crimping it all around. This former construction was intended for use with a fixed or swinging window and had no provision permitting the use of a vertically sliding window.

According to the present invention I provide for such a vertically sliding window, and I do so without weakening the structure of the side wall, but in materially strengthening it and I provide for the proper guidance of the window in its movements by a structure which is exceedingly simple and lends itself readily to assembly with the inner panel prior to its assembly with the outer panel and the final assembly of the inner and outer panels in this region.

The main element of the novel rear quarter window construction is a continuous one-piece sheet metal frame 18, shown detached in Fig. 2 and in section and combined with the associated outer and inner panels in Figs. 4, 5, 6 and 9. Around the top and sides this frame 18 is formed of substantially Z-section, the web portion 19 of which extends transversely of the body wall and forms the bottom wall of the glass run channel. At the bottom, however, this transverse portion of the frame is omitted to permit the passage of the window glass down into the well between the inner and outer panels, the outer arm 20 of the Z-section sides and top alone being extended across the bottom of the frame, and provided, in this region, as shown in Fig. 5, with an outwardly extending stiffening flange 21.

The inner arm 22 of the Z-section sides and top of the frame 18 is readily assembled and secured to the unitary inner panel 11, since the latter is provided with an outwardly extending flange 23 extending around the sides and top of the window opening, which forms with the body of the panel, an angular formation around these three sides of the window opening which is adapted to nest with the corresponding angular formation formed by the web 19 and the inner arm 22 of the Z-section frame top and sides, thereby aiding in locating these parts readily in assembly, and providing readily accessible parts for joining these parts, as by spot welding, through the contacting portions of the nested angular formations.

To permit the ready insertion of the window into the frame from the inside, the opening in the inner panel is extended downwardly below the window opening for some distance to the point 24, Figs. 1 and 5. The flange 23 which extends outwardly from the body of the panel 11 at the side and top margins of the window opening is extended downwardly to and across the bottom of the opening in the inside panel, as clearly appears from an inspection of Figs. 5, 7 and 10.

The outer arms of the Z-section sides and top of the frame 18 form with the web of the Z, respectively, the outer side and bottom walls of the glass run channels at the top and at the sides of the window opening.

Below the window opening, the glass run channels are formed by welding together a Z-section member 25 and an angle strip 26. The channel so formed is nested at the top in the angle formed by the body of the inner panel and the flange 25 and secured thereto, as by spot welding. Below the opening in the inner panel the glass run channel is secured to the body of the inner panel as by welding, and at the crown of the wheel housing by a tab or tabs 27 welded thereto.

With the lower portions of the glass runs and the frame 18 so rigidly secured to the inner panel stamping, it is finally assembled to the outer panel, which is formed entirely around the window opening with a window moulding 28 which is flanged as at 29 in the plane of the window entirely around said window opening. The frame 18 is, prior to final assembly, formed with the lateral outwardly extending flange 30 continuous around the window opening, and this flange is, in the final assembly, crimped over the flange 28 of the outer panel to lock the parts together in the region of the window opening. The joinder of the outer and inner panels may be made in regions remote from the window opening as already pointed out hereinbefore.

A removable window regulator panel stamping 32 bridges the space left open by the integral inner panel 11 below the rear quarter window opening, and is secured in place by suitable screws as 31. This panel is flanged inwardly and downwardly at its upper edge as shown at 33, Fig. 5, and extends around the lower rounded corners of the window opening.

All of the corners of the window opening are well rounded to provide a pleasing appearance, and to afford ease of forming the parts extending around said opening by simple die stamping operations. If it is desired to use a glass having square corners, the upper corners of the frame 18 may be slotted, as shown at 34, to permit the full raising of the window.

While I have described herein a specific embodiment of my invention, it will be understood that changes and modifications may be made without departing from the spirit of the invention, and such changes and modifications are intended to come within the spirit and scope of the appended claims.

What I claim is:

1. In a vehicle body construction having a vertically sliding rear quarter window independent of outer and inner paneling, a frame unit for said window and outer and inner paneling comprising a closed one-piece stamping surrounding the window opening and having its sides and top forming in cross section the outer side wall and the bottom of a glass run channel and connecting the outer and inner paneling.

2. In a vehicle body construction having a vertically sliding rear quarter window, a frame for said window comprising a closed one-piece stamping surrounding the window opening forming portions of the glass run channels, and an outer panel also extending around said window opening and secured to said stamping in the margins of the window opening by clinching together their adjacent edges entirely around said opening.

3. In a vehicle body construction having a vertically sliding rear quarter window, a frame for said window comprising a closed one-piece stamping surrounding the window opening and forming at sides and top the outer side wall and bottom of the glass receiving channel, an outer panel also extending around the window opening and secured to said stamping in the margin of said opening, and an inner panel secured to the inner edge of the sides and top of said stamping and to the outer panel at points remote from the window opening.

4. In a vehicle body construction having a slidable rear quarter window, a frame therefor comprising a one-piece stamping extending around the window opening and flanged laterally at sides and top to form the base of a glass run channel, of an inner panel extending around the sides and top of said opening and joined to said laterally extending flange.

5. In a vehicle body construction having a slidable rear quarter window, a hollow body wall in the region of said window comprising one-piece inner and outer panels extending around the window openings and joined in the margins of said window opening at top and sides, the said one-piece inner panel terminating short of the bottom of said window opening to provide space for the application of a removable regulator panel, and a regulator panel removably secured at the bottom of the window opening.

6. In a vehicle body construction having a slidable rear quarter window, a hollow body wall in the region of said window opening, comprised of inner and outer panels between which the window slides when lowered and raised, and glass run channels below the window opening connected to said inner panel, and braced at the margin of the rear door opening from a transverse portion of the outer panel forming the door jamb.

7. In a vehicle body construction having a slidable rear quarter window, a continuous window frame forming the base of the glass run at the top and side margins of the window opening, and being laterally flanged at the inner margin thereof, to form an angle, said angle being nested with and secured to a corresponding angular edge of a continuous inner panel extending around the sides and top of said window opening.

8. In a vehicle body construction having a vertically sliding rear quarter window independent of outer and inner paneling, a frame unit for said window and outer and inner paneling comprising a closed one-piece stamping surrounding the window opening and having its vertically extending side portions each flanking a side and the bottom of a glass run channel, said stamping connecting the outer and inner paneling.

9. In a vehicle body construction having a vertically sliding rear quarter window, a frame for said window comprising a closed one-piece stamping surrounding the window opening, and having its vertically extending side and the top portion interconnecting said side portions each flanking the outer side and the bottom of a glass run channel, and an outer panel also extending around the window opening and secured to said stamping in the side and top margins of the window opening.

10. In a vehicle body construction having a vertically sliding rear quarter window, a frame for said window comprising a closed one-piece stamping surrounding the window opening and flanking, in the side and top margins of said opening, the outer side and the bottom of a glass run channel, an outer panel also extending around the window opening and secured to said stamping in the margin of the opening, said stamping being extended from its inner portions and joined additionally to the outer panel through such extension at points remote from said opening.

In testimony whereof I hereunto affix my signature.

JOSEPH LEDWINKA.